United States Patent [19]

Krimm et al.

[11] 4,431,795
[45] Feb. 14, 1984

[54] COPOLYMERS OF CYCLIC CARBONIC ACID ESTERS AND LACTAMS AND THEIR PRODUCTION

[75] Inventors: Heinrich Krimm; Hans-Josef Buysch; Artur Botta, all of Krefeld, Fed. Rep. of Germany

[73] Assignee: Bayer Aktiengesellschaft, Leverkusen, Fed. Rep. of Germany

[21] Appl. No.: 384,566

[22] Filed: Jun. 3, 1982

Related U.S. Application Data

[63] Continuation-in-part of Ser. No. 314,126, Oct. 23, 1981, abandoned.

[30] Foreign Application Priority Data

Oct. 29, 1980 [DE] Fed. Rep. of Germany ....... 3040612

[51] Int. Cl.$^3$ .............................................. C08G 69/14
[52] U.S. Cl. .................................. 528/323; 528/327; 528/328; 528/369; 528/326
[58] Field of Search ............... 528/323, 327, 328, 369, 528/326

[56] References Cited

U.S. PATENT DOCUMENTS

| 2,600,953 | 6/1952 | Aelion | 528/323 |
|---|---|---|---|
| 2,786,045 | 3/1957 | Chirtel et al. | 528/323 |
| 3,197,441 | 7/1965 | Wehrmeister | 528/323 |
| 3,228,759 | 1/1966 | Small et al. | 51/298 |
| 3,378,532 | 4/1968 | Fritz et al. | 260/78 |
| 3,450,793 | 6/1969 | Schnell et al. | 525/467 |
| 3,551,388 | 12/1970 | Sippel et al. | 528/335 |
| 3,592,873 | 7/1971 | Ishida et al. | 528/310 |
| 3,925,325 | 12/1975 | Heimsch et al. | 528/323 |
| 4,208,493 | 6/1980 | Deleens et al. | 528/323 |
| 4,265,247 | 5/1981 | Lenz et al. | 528/323 |

FOREIGN PATENT DOCUMENTS

| 1495747 | 7/1969 | Fed. Rep. of Germany . |
|---|---|---|
| 1809341 | 6/1970 | Fed. Rep. of Germany . |
| 2023467 | 8/1970 | France . |
| 1112943 | 5/1968 | United Kingdom . |

*Primary Examiner*—Harold D. Anderson
*Attorney, Agent, or Firm*—Connolly and Hutz

[57] ABSTRACT

A process for producing an anionic copolymer containing urethane and carboxylic acid ester moieties with or without carbonate moieties, carbonamide moieties, or both carbonate and carbonamide moieties, having weight average molecular weights from 1,000 to 150,000, determined by light diffusion method, which comprises heating an anhydrous mixture of 20 to 80% by weight of lactam and 80 to 20% by weight of a cyclic carbonate at temperatures between 100° and 250° C. in the presence of 0.001 to 1% by weight, based on the quantity of monomers, of an alkaline catalyst and copolymers produced thereby which are useful as adhesives, plasticizers and lacquers.

10 Claims, No Drawings

COPOLYMERS OF CYCLIC CARBONIC ACID ESTERS AND LACTAMS AND THEIR PRODUCTION

This application is a continuation-in-part application of our copending US-application, Ser. No. 314,126, filed Oct. 23, 1981 now abandoned.

This invention relates to novel copolymers of cyclic carbonates and lactams and to a process for their production.

It is known that lactams can be anionically polymerised in the presence of alkaline catalysts. In such a process, the lactam ring is opened via the intermediate stage of a metal lactamate and a linear polymer containing amide groups is formed.

It is also known that cyclic carbonates, for example trimethylene carbonate, can be polymerised in the presence of alkaline catalysts to form linear macromolecules containing carbonate groups.

If, therefore, a mixture of a lactam and a cyclic carbonate is treated with an alkaline catalyst, the predicted reaction product formed would be a polymerisation mixture containing amide and carbonate groups which, so far as its properties are concerned, is essentially a mixture of the homopolymers of the starting materials.

It has surprisingly been found that, in practice, this is not the case because the copolymerisation of equimolar quantities of lactams and cyclic carbonates in the presence of alkaline catalysts gives reaction products having properties which cannot be derived simply from the properties of the homopolymers. Spectroscopically, it can be shown that both the amide groups and also the carbonate groups have disappeared, being replaced by the bands typical of urethane groups and carboxylic acid ester groups. It must be concluded from this that the alkaline copolymerisation of lactams and cyclic carbonates is a new type of alternating copolymerisation reaction which takes place in accordance with the following reaction scheme:

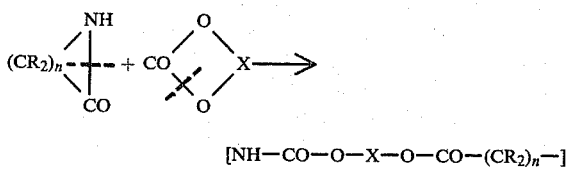

$$[NH-CO-O-X-O-CO-(CR_2)_n-]$$

in which R, X and n are as defined hereinafter.

The considerable extent to which the properties of the homopolymers of the starting materials are changed in the novel copolymers may be illustrated with reference, by way of example, to the reaction product of caprolactams and neopentyl glycol carbonate. The copolymer is colourless, transparent, elastomeric to plastic and tacky, whilst the polyamide of caprolactam and the polycarbonate of neopentyl glycol carbonate are white, opaque substances characterised by well-defined melting points and considerable rigidity and hardness. There are also considerable differences in solubility. Whereas the polyamide is only soluble in a few unusual solvents, such as concentrated sulfuric acid, formic acid and cresol, the copolymer of caprolactam and neopentyl glycol carbonate is readily soluble in numerous, standard organic solvents, such as methylene chloride, acetone, methanol and ethyl acetate.

Accordingly, the present invention provides anionic copolymers of lactams and cyclic carbonic acid esters containing urethane and carboxylic acid ester groups and a process for their production characterised in that anhydrous mixture of lactams and cyclic carbonic acid esters are heated in the presence of alkaline catalysts. The invention further provides the use of these copolymers as plastics, adhesives, plasticisers and lacquer binders.

Suitable lactams correspond to the following formula:

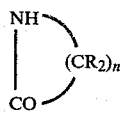

in which
R represents hydrogen or a $C_1-C_4$-alkyl group, and
n is an integer of from 2 to 13.

Particularly suitable lactams are 4,4-dimethyl-2-acetidinone, 2-pyrrolidone, 2-piperidone, $\epsilon$-caprolactam, 4-tert.-butyl caprolactam, capryllactam and lauric lactam; $\epsilon$-caprolactam, lauric lactam and 2-pyrrolidone being particularly preferred.

Suitable cyclic carbonic acid esters are monocyclic compounds containing from 1 to 3 carbonate groups in the ring which are synthesized from alcohols corresponding to the following formula:

$$HO-X-OH$$

in which
X represents a $C_2-C_{12}$-alkylene chain which may optionally be substituted by at least one $C_1-C_4$-alkyl group, is interrupted by one to three oxygen atoms and may be attached through the group $-CH_2-O-CH_2-$ or $-CH_2-O-CO-O-CH_2-$ to another one or two alkylene chains represented by X, for example trimethylene carbonate, neopentyl glycol carbonate, 1,3-butane diol carbonate, octamethylene carbonate, decamethylene carbonate, dodecamethylene carbonate, triethylene glycol carbonate, also the dimeric carbonates of 1,6-hexane diol, 1,5-pentane diol, 1,10-decane diol, diethylene glycol, triethylene glycol, the trimeric carbonates of diethylene glycol and the bicyclic carbonates of trimethylol propane, pentaerythritol and dimethylol propane.

The copolymerisation components may be used in any quantitative ratio because the component which is in excess over the stoichiometic ratio is itself polymerisable. It is thus readily possible to vary the properties of the end product within wide limits insofar as, depending upon the excess of one or the other component, the properties of the end product may be made to approximate more the property spectrum of the associated homopolymer.

The mixtures subjected to copolymerisation are in particular mixtures consisting of from 10 to 90% by weight of the lactam and 90 to 10% by weight of the cyclic carbonate and preferably 20 to 80% by weight of the lactam and 80 to 20% by weight of the cyclic carbonate.

Depending upon the quantitative ratio between the reactants, the copolymers may additionally contain spectroscopically detectable carbonamide and carbonate groups.

In general, the reactants are reacted in the melt. However, polymerisation may also be carried out in solution, in which case the solvents used may be aprotic solvents, such as aromatic hydrocarbons, ethers, dimethyl acetamide and dimethyl sulfoxide.

The copolymers have molecular weights of from about 1000 to about 150,000, more particularly from 5000 to 75,000 and preferably from 8000 to 40,000. All the molecular weights specified herein are weight averages determined by the light diffusion method.

Catalysts suitable for the process are, for example, alkali compounds, such as lithium, sodium, potassium metals, oxides, hydroxides, carbonates, alcoholates, lactamates and the alkali salts of weak acids, such as hydrocyanic acid, and of carboxylic acids.

The catalysts are preferably used in quantities of from 0.001 to 1% by weight and preferably in quantities of from 0.01 to 0.2% by weight, based on the quantity of monomers.

In one method of application which is preferred in the interests of effective distribution of the catalyst, the catalyst in the form of an alkali metal is dissolved in part of the lactam and the homogeneous lactamate solution is added to a melt of the other components.

The polymerisation temperatures are in the range from 100° to 250° C. and preferably in the range from 120° to 180° C.

The new copolymers may be commercially used in numerous ways. They may be used as plastics, adhesives, plasticisers and lacquers capable of modification within wide limits.

EXAMPLE 1

11.3 g (0.1 mole) of dry caprolactam, 13 g (0.1 mole) of dry neopentyl glycol carbonate and 10 mg of sodium dissolved in approximately 1 g of the caprolactam used are kept under nitrogen for 2 hours at 150° C. After cooling, a high molecular weight, colourless, tacky, elastomeric, plastic polymer is obtained in a quantity of 14.3 g, forming a clear solution in methanol, methylene chloride, acetone and ethyl acetate and having a molecular weight of 12,000.

According to the results of NMR and IR analysis, the carbonate groups have completely disappeared together with most of the amide groups. In their place, carboxylic acid ester groups and urethane groups are predominantly present in substantially equal numbers.

EXAMPLE 2

22.6 g (0.2 mole) of caprolactam, 6.5 g (0.05 mole) of neopentyl glycol carbonate and 15 mg of sodium are kept for 1 hour at 130° C. in the manner described in Example 1. The melt becomes thickly liquid after only about 5 minutes. It is kept at 160° C. for 2 hours. After cooling, the reaction product (29.1 g) has a high molecular weight and is whitish to opaque, tough and hard. It forms a clear solution in hot methanol and dimethyl fomamide and precipitates in the form of a gel on cooling. It is insoluble in methylene chloride. Its molecular weight amounts to approximately 19,000. IR and NMR spectra show carbonamide, carboxylic acid ester and urethane groups but no carbonate groups.

EXAMPLE 3

26 g (0.2 mole) of neopentyl glycol carbonate and 1.1 g (0.01 mole) of caprolactam in which 10 mg of sodium are dissolved are heated to 125° C. After 10 minutes, the temperature suddenly rises to 140° C. and polymerisation begins. The polymerisation mixture is kept for 1 hour at 130° C. After cooling, the reaction product (27.1 g) has a high molecular weight and is white, opaque, hard and rigid. It is insoluble in methanol and forms a clear solution in methylene chloride. It has a molecular weight of the order of 23,000.

EXAMPLE 4

11.3 g (0.1 mole) of caprolactam, 14.4 g (0.05 mole) of bis-hexamethylene dicarbonate and 10 mg of sodium are kept as described in Example 1 at 160° C. for 6 hours during which the mixture becomes increasingly more viscous. A high molecular weight, colourless, slightly opaque, tough reaction product (25.7 g) is obtained after cooling. It forms a clear solution in methylene chloride and benzene and swells in ethyl acetate and methanol. A film which adheres to the form of the glass may be cast from methylene chloride solution and may be peeled off by means of water. The film may be drawn and thereafter shows considerable tensile strength. If it is kept at 100° C. between glass plates, a bond which holds firm at low temperatures is established.

The copolymer has a molecular weight of the order of 28,000.

EXAMPLE 5

2 g of caprolactam in which 10 mg of sodium are dissolved are added to a melt of 20 g of neopentyl glycol carbonate and 2 g of ditrimethylol propane dicarbonate. Polymerisation begins immediately accompanied by crosslinking. The polymerisation mixture is kept for 2 hours at 160° C. The reaction product (22 g) is infusible and insoluble in solvents. It is colourless, transparent, tough and highly resistant to breakage.

EXAMPLE 6

20 g of neopentyl glycol carbonate, 2 g of 3,3-oxetanespiro-dimethylene carbonate and 2 g of caprolactam in which 15 mg of sodium are dissolved are kept at 190° C. for 2 hours. A slightly crosslinked reaction product (24 g) which is like rubber at room temperature is obtained.

EXAMPLE 7

10 mg of potassium are added to a melt of 17.5 g (0.155 mole) of caprolactam and 7.8 g (0.06 mole) of neopentyl glycol carbonate. After 2 hours at 160° C., a colourless, elastomeric transparent reaction product (25.3 g) is obtained. Its molecular weight is to 18,000.

EXAMPLE 8

11.3 g (0.1 mole) of caprolactam, 13.2 g (0.05 mole) of bis-diethylene glycol dicarbonate and 10 mg of sodium dissolved in 1 g of the caprolactam are kept for 6 hours at 160° C. The reaction product (24.5 g) has a high molecular weight and is colourless, transparent, like soft rubber and plastic. It has a molecular weight of 9000.

EXAMPLE 9

11.3 g (0.1 mole) of caprolactam, 17.6 g (0.05 mole) of bis-triethylene glycol dicarbonate and 15 mg of sodium dissolved in part of the caprolactam are kept for 2 hours at 160° C. The reaction product (28.9 g) has a high molecular weight, is colourless, transparent, like soft rubber and plastic. Its molecular weight amounts to 10,500.

EXAMPLE 10

16.9 g (0.1 mole) of 4-tert.-butyl caprolactam, 13 g (0.1 mole) of neopentyl glycol carbonate and 10 mg of sodiun are kept at 150° C. for 4 hours. The reaction product (29.9 g) has a high molecular weight and is colourless, transparent and plastic. Its molecular weight amounts to 7800.

EXAMPLE 11

19.7 g (0.1 mole) of lauric lactam, 13 g (0.1 mole) of neopentyl glycol carbonate and 10 ml of sodium dissolved in part of the lauric lactam are kept for 6 hours at 150° C. A high molecular weight, opaque, tough reaction product (32.7 g) having a molecular weight of 18,000 is obtained.

Supplemental Disclosure

To a melt of 100 g neopentyl glycol carbonate and 10 g di-trimethylolpropane-dicarbonate 10 g caprolactam is added at 110° C. wherein 25 mg Na is solved. The mixture is well stirred and thereafter poured between two glass sheets being in a distance of 4 mm by a teflon-asbestos string, and kept therein for two hours at 160° C. A colourless, transparent plastic sheet is thereafter obtained having high toughness and tensile strength. The plastic sheet is not meltable and insoluble in all known organic solvents. Test rods made therefrom are tested according DIN 53 452: Flexural strength: MPa 95,8; variation coefficient (%) 5; Bending underload in imm 10.32; edge fiber elongation (%) 5.92.

We claim:

1. A process for producing an anionic copolymer containing urethane and carboxylic acid ester moieties having weight average molecular weights from 1,000 to 150,000, determined by light diffusion method, which comprises heating an anhydrous mixture of 20 to 80 % by weight of lactam and 80 to 20% by weight of a cyclic carbonate at temperatures between 100° and 250° C. in the presence of 0.001 to 1% by weight, based on the quantity of monomers, of an alkaline catalyst.

2. A process as claimed in claim 1 wherein the lactam is of the formula

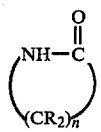

wherein R is H or alkyl having from 1 to 4 carbon atoms and n is an integer of from 2 to 13; and said cyclic carbonic acid ester is a monocyclic carbonic acid ester having from 1 to 3 ring carbonate moieties and prepared from an alcohol of the formula HO—X—OH wherein X is alkylene having 1 to 12 carbon atoms, alkylene having 1 to 12 carbon atoms substituted by alkyl having 1 to 4 carbon atoms, alkylene having 1 to 12 carbon atoms interrupted by 1 to 3 oxygen atoms, alkylene bonded to one or two additional alkylenes by a —CH$_2$—O—CH$_2$— bridge or a —CH$_2$—OCO—O—CH$_2$— bridge with each alkylene moiety having 1 to 12 carbon atoms.

3. A process as claimed in claim 1, wherein the anhydrous mixture is heated in an aprotic solvent.

4. A process as claimed in claim 1, wherein a lactam corresponding to the following formula:

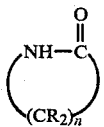

in which
R and n are defined as in claim 3,
is reacted with a monocyclic carbonic acid ester containing from 1 to 3 carbonate groups in the ring which is synthesized from an alcohol corresponding to the following formula:

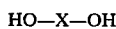

in which X is as defined in claim 3.

5. A copolymer product obtained from the process according to claim 12.

6. An anionic copolymer as claimed in claim 5 comprising recurring units of the structural formula

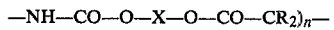

wherein
R is H or alkyl having from 1 to 4 carbon atoms,
n is an integer of from 2 to 13, and
X is alkylene having 1 to 12 carbon atoms, alkylene having 1 to 12 carbon atoms substituted by alkyl having 1 to 4 carbon atoms, alkylene having 1 to 12 carbon atoms interrupted by 1 to 3 oxygen atoms, or alkylene bonded to one or two additional alkylenes by a —CH$_2$—O—CO—O—CH$_2$— bridge with each alkylene moiety having 1 to 12 carbon atoms.

7. A copolymer product obtained from the process according to claim 3.

8. A copolymer product obtained from the process according to claim 2.

9. An anionic copolymer as claimed in claim 5, having a molecular weight of from 8000 to 40,000.

10. A plastic, adhesive, plasticizer or lacquer comprising at least one anionic polymer as claimed in claim 5.

* * * * *